(12) United States Patent
Akisada et al.

(10) Patent No.: US 11,663,900 B2
(45) Date of Patent: May 30, 2023

(54) APPARATUS, METHOD AND STORAGE MEDIUM FOR DETECTING WHEN A VIEWED EQUIPMENT IS DIFFERENT FROM AN EQUIPMENT TO BE INSPECTED

(71) Applicant: Yokogawa Electric Corporation, Tokyo (JP)

(72) Inventors: Yukiyo Akisada, Tokyo (JP); Yasuki Sakurai, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 17/450,073

(22) Filed: Oct. 6, 2021

(65) Prior Publication Data

US 2022/0114876 A1 Apr. 14, 2022

(30) Foreign Application Priority Data

Oct. 13, 2020 (JP) .............................. JP2020-172801

(51) Int. Cl.
*G08B 21/18* (2006.01)

(52) U.S. Cl.
CPC .................................. *G08B 21/187* (2013.01)

(58) Field of Classification Search
CPC ........ G08B 21/187; G06N 5/04; G06N 20/00; G06K 17/0022; G06K 19/0723; G05B 23/0216
See application file for complete search history.

(56) References Cited

U.S. PATENT DOCUMENTS

| 6,417,760 B1* | 7/2002 | Mabuchi .................. G07C 1/10 235/382 |
| 10,388,075 B2* | 8/2019 | Schmirler ................ G06F 3/147 |
| 10,535,202 B2* | 1/2020 | Schmirler .......... G06Q 10/0633 |
| 10,735,691 B2* | 8/2020 | Schmirler .......... H04N 5/23238 |
| 11,159,771 B2* | 10/2021 | Schmirler .............. H04N 7/181 |
| 11,265,513 B2* | 3/2022 | Schmirler ............. G06T 19/006 |
| 2017/0061212 A1 | 3/2017 | Tanaka |
| 2018/0130260 A1* | 5/2018 | Schmirler ................ G06F 3/011 |
| 2018/0131907 A1* | 5/2018 | Schmirler .......... H04N 5/23238 |

(Continued)

FOREIGN PATENT DOCUMENTS

| EP | 3318945 A2 * | 5/2018 | ......... G05B 23/0216 |
| EP | 3318945 A2 | 5/2018 |

(Continued)

OTHER PUBLICATIONS

Extended European Search Report for European Patent Application No. 21202098.6, issued by the European Patent Office dated Mar. 18, 2022.

*Primary Examiner* — Hoi C Lau

(57) ABSTRACT

An apparatus is provided, comprising: a storage portion for storing, by each position on a patrol route, an equipment to be inspected in a plant which should be inspected by viewing by a patroller; a position acquisition portion for acquiring a position of a patroller on a patrol route; a first detection portion for detecting a viewed equipment which has been viewed by a patroller; and an alert portion for outputting an alert signal about the viewed equipment, in response to a fact that the equipment to be inspected, which corresponds to a position of a patroller on a patrol route, is not detected as the viewed equipment.

10 Claims, 7 Drawing Sheets

(56) References Cited

U.S. PATENT DOCUMENTS

| | | | | |
|---|---|---|---|---|
| 2019/0325660 A1* | 10/2019 | Schmirler | ............... | G06F 3/011 |
| 2020/0336706 A1* | 10/2020 | Schmirler | .......... | H04N 5/23238 |
| 2020/0336707 A1* | 10/2020 | Schmirler | .......... | G05B 23/0216 |
| 2020/0401861 A1* | 12/2020 | Akechi | ............. | G06K 17/0022 |
| 2021/0049484 A1* | 2/2021 | Job | ........................ | G06N 20/00 |

FOREIGN PATENT DOCUMENTS

| | | | |
|---|---|---|---|
| JP | 2013200440 | A | 10/2013 |
| JP | 2015011086 | A | 1/2015 |
| JP | 2016177565 | A | 10/2016 |
| JP | 2017207670 | A | 11/2017 |
| JP | 2018013958 | A | 1/2018 |
| JP | 2018049258 | A | 3/2018 |
| JP | 2020052290 | A | 4/2020 |

\* cited by examiner

APPARATUS, METHOD AND STORAGE MEDIUM FOR DETECTING WHEN A VIEWED EQUIPMENT IS DIFFERENT FROM AN EQUIPMENT TO BE INSPECTED

The contents of the following Japanese patent application(s) are incorporated herein by reference:
2020-172801 filed in JP on Oct. 13, 2020

BACKGROUND

1. Technical Field

The present invention relates to an apparatus, a method and a recording medium.

2. Related Art

Patent Document 1 describes, "detects the line of sight of a user to control information communication with other communication equipment".

Patent Document 1 Japanese Patent Application Unexamined Publication 2016-177565

SUMMARY

In the first aspect of the present invention, an apparatus is provided. The apparatus may include a storage portion for storing, by each position on a patrol route, an equipment to be inspected in a plant to be inspected by viewing by a patroller. The apparatus may include a position acquisition portion for acquiring a position of a patroller on a patrol route. The apparatus may include a first detection portion for detecting the viewed equipment which has been viewed by a patroller. The apparatus may include an alert portion for outputting an alert signal about the viewed equipment, in response to a fact that the equipment to be inspected, which corresponds to a position of a patroller on a patrol route, is not detected as the viewed equipment.

In the second aspect of the present invention, a method is provided. The method may include storing step for storing, by each position on a patrol route, an equipment to be inspected in a plant, which should be inspected by viewing by a patroller. The method may include position acquiring step for acquiring position of a patroller on a patrol route. The method may include first detecting step for detecting a viewed equipment, which has been viewed by a patroller. The method may include alerting step for outputting an alert signal about the viewed equipment, in response to a fact that the equipment to be inspected, which corresponds to a position of a patroller on a patrol route, is not detected as the viewed equipment.

In the third aspect of the present invention, a recording medium on which a program is recorded thereon is provided. The program may cause a computer function as a storage portion for storing, by each position on a patrol route, an equipment to be inspected in a plant, which should be inspected by viewing by a patroller. The program may cause a computer function as a position acquisition portion for acquiring position of a patroller on a patrol route. The program may cause a computer function as a first detection portion for detecting a viewed equipment, which has been viewed by a patroller. The program may cause a computer function as an alert portion for outputting an alert signal about the viewed equipment, in response to a fact the equipment to be inspected, which corresponds to a position of a patroller on a patrol route, is not detected as the viewed equipment.

The summary clause does not necessarily describe all necessary features of the embodiments of the present invention. The present invention may also be a sub-combination of the features described above.

DESCRIPTION OF EXEMPLARY EMBODIMENTS

Hereafter, the present inventions are described through the embodiments, however, the embodiments listed below do not limit the inventions according to the scopes of the claims. Moreover, not all the combinations of the features described in the embodiments are essential for the means of solving the problems of the inventions.

[1. Configuration of the Maintenance Management System 1]

Figure 1:
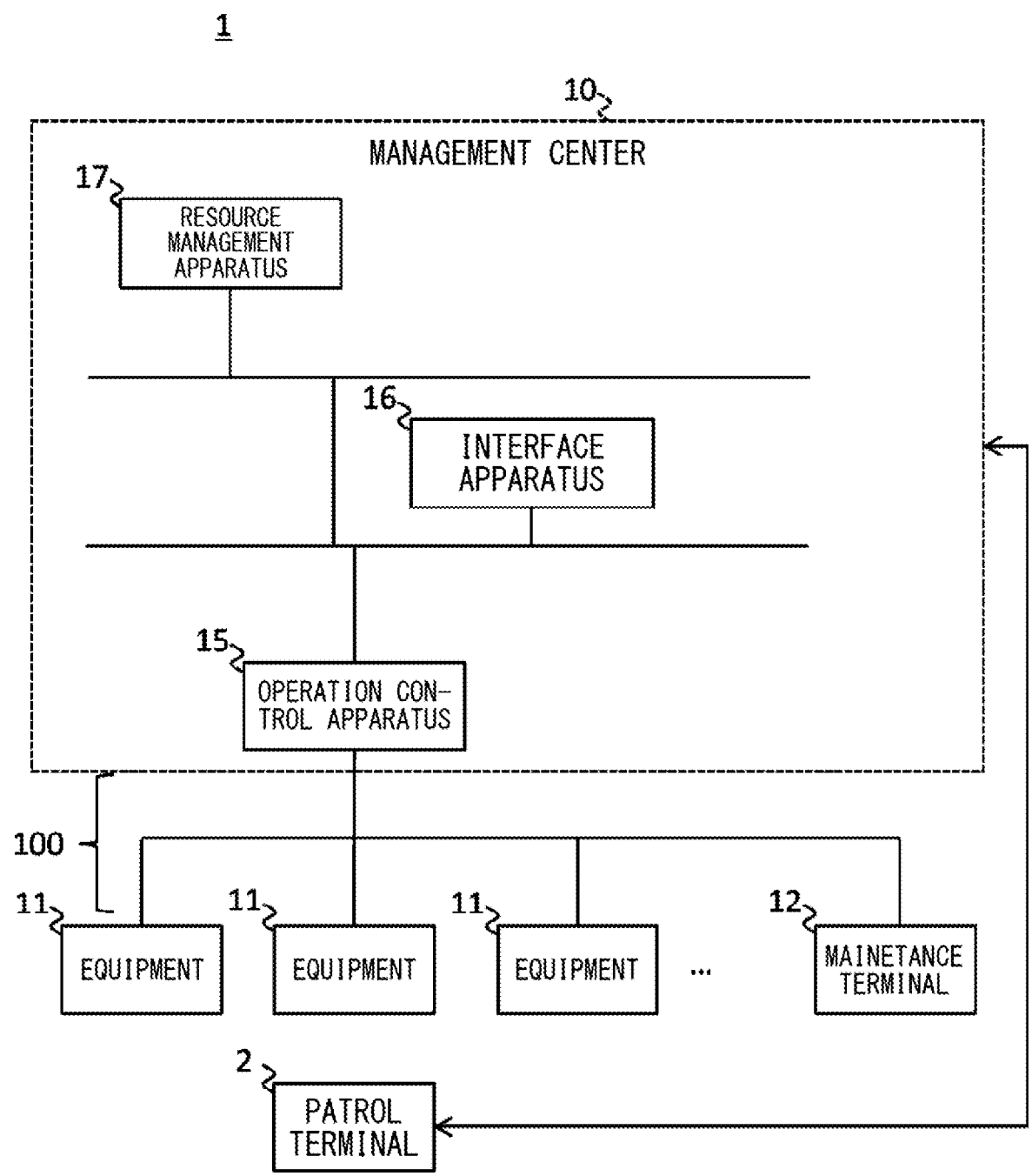
FIG. 1 shows a maintenance management system 1 according to the embodiment.

FIG. 1 shows a maintenance management system 1 according to the embodiment. The maintenance management system 1 is for conducting maintenance management of a plant, and includes multiple equipments 11, a maintenance terminal 12, a patrol terminal 2, an operation control apparatus 15, an interface apparatus 16 and a resource management apparatus 17.

Here, the plant includes, in addition to an industrial plant such as a chemical industrial plant, a plant for managing and controlling a wellhead such as a gas field and oil field and its surroundings, a plant for managing and controlling an electrical power generation such as water power, fire power, and nuclear power, a plant for managing and controlling an energy harvesting such as photovoltaic power generation and wind-power generation, and a plant for managing and controlling a water and sewerage, a dam, and the like. Each equipment 11, the maintenance terminal 12 and the patrol terminal 2 may be disposed in a site where a process is to be performed in a plant. For example, in the site, a piping for flowing the fluid to be measures, and a flow rate meter installed at the piping for measuring the flow rate of the fluid, etc., exist. The operation control apparatus 15, the interface apparatus 16 and the resource management apparatus 17 may be disposed in the management center 10 in the plant.

[1-1. Equipment 11]

The multiple equipments 11 are machines or apparatuses, for example, they may include a sensor for measuring a physical amount such as pressure, temperature, pH, speed, flow rate in a process in the plant, or may include a valve for controlling any physical amount, a flow rate control valve, an on-off valve, a pump, a fan, a motor, a heating apparatus, an actuator such as a cooling apparatus, or may include an audio equipment such as a microphone, a speaker, etc., for collecting abnormal noise and the like or for emitting alert sound and the like in the plant, or may include a position detection equipment for outputting a position information of each equipment, or may include a piping for flowing a fluid, or may include other equipments. Each equipment 11 among the multiple equipments 11 may be of the different category, or at least some two or more equipments 11 may be of the same category.

Each equipment 11 may be connected to the operation control apparatus 15 wiredly or wirelessly via a control network 100. Communication within the control network 100 may be a digital communication, or may be a hybrid communication which superimposes a digital signal over an analog signal (4 to 20 mA signal, etc.), and it may be at around a speed of 1000 bps to 10000 bps (as an example, 1200 bps, 2400 bps). Communication within the control network 100 may be performed by a wireless communication protocol of, for example, ISA (International Society of Automation), and as an example, it may be performed by ISA100, HART (Highway Addressable Remote Transducer) (registered trademark), BRAIN (registered trademark), FOUNDATION Fieldbus, PROFIBUS and the like.

Each equipment 11 may have its unique identification information (this is also called "equipment-unique information"). The equipment-unique information is information for uniquely identifying an equipment. In this embodiment, as an example, it may be at least one of a serial number given to the equipment 11 by the communication protocol (as an example, HART), a serial number set up by the manufacturer of the equipment 11, and an equipment ID.

[1-2. Maintenance Terminal 12]

The maintenance terminal 12 accesses the setting parameter of the equipment 11 to refer, set, change, etc., the setting parameter value. The maintenance terminal 12 may be a hand-held terminal (HHT) (as an example, a smartphone or a tablet PC) carried by a local operator, or may be a stationary type PC. If the maintenance terminal 12 is a hand-held terminal, the maintenance terminal 12 may be detachably connected to the equipment 11.

[1-3. Patrol Terminal 2]

The patrol terminal 2 is an example of the apparatus, and is used for patrolling in a plant. The patrol terminal 2 may wirelessly communicate with at least one of the operation control apparatus 15, the interface apparatus 16 or the resource management apparatus 17 in the management center 10. Note that, the detail of the patrol terminal 2 is described later.

[1-4. Operation Control Apparatus 15]

The operation control apparatus 15 communicates with each equipment 11 to control the process. For example, the operation control apparatus 15 acquires a process value, which is the measurement data, from the equipment 11, which is the sensor, to actuate the equipment 11, which is the actuator. Then, the operation control apparatus 15 may supply the process value to the interface apparatus 16, to accordingly receive a target value of the process value from the interface apparatus 16. Note that, in this embodiment, description is made, as an example, under the condition that a single operation control apparatus 15 is equipped to the maintenance management system 1 to control the equipment 11, however, multiple operation control apparatuses 15 may be equipped in order that each of them control one or more equipments 11 in a distributed manner. The operation control apparatus 15 may be, as an example, an FCS (Field Control Station).

[1-5. Interface Apparatus 16]

The interface apparatus 16 interfaces between a manager and the plant. The interface apparatus 16 may control the process of the plant via the operation control apparatus 15, in response to the operation by the manager. For example, the interface apparatus 16 may receive a process value from the operation control apparatus 15 to supply the target value of the process value to the operation control apparatus 15. Moreover, the interface apparatus 16 may change the value of the setting parameter of the equipment 11 via the operation control apparatus 15. Furthermore, the interface apparatus 16 may store the value of the setting parameter of said equipment 11, associating it to at least one or more equipments 11. The interface apparatus 16 may be, as an example, an HIS (Human Interface Station), and may be configured by a PC.

[1-6. Resource Management Apparatus 17]

The resource management apparatus 17 conducts online monitoring and centralized management of the plant. For example, the resource management apparatus 17 may manage information (as an example, the value of the setting parameter and the process value) of the equipment 11 acquired by the operation control apparatus 15, etc. The resource management apparatus 17 may be configured, as an example, by a PC and the like.

[2. Patrol Terminal 2]

Figure 2:
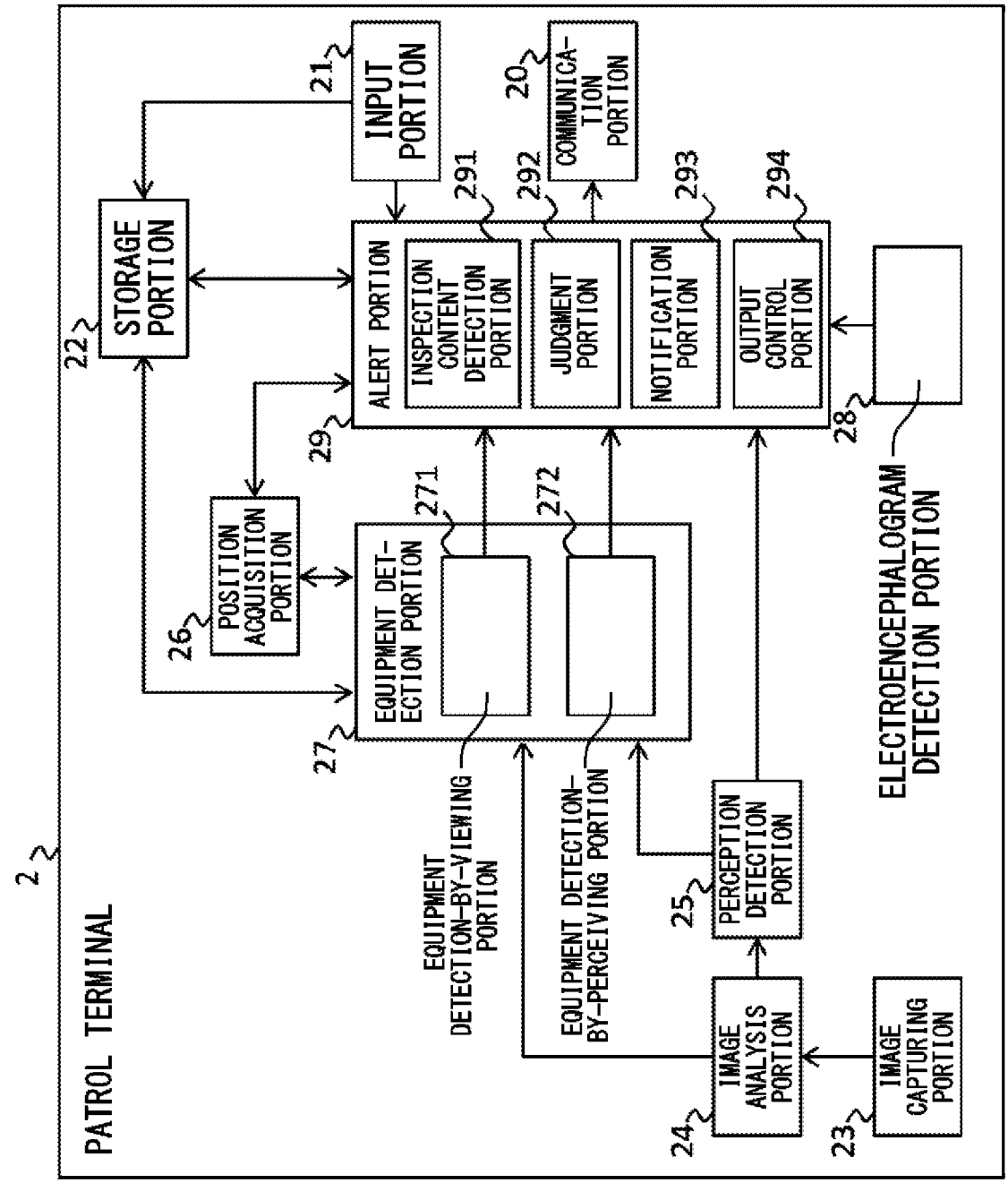
FIG. 2 shows a patrol terminal 2.

FIG. 2 shows a patrol terminal 2. The patrol terminal 2 is used by a patroller who patrols within the plant along a predetermined patrol route. The patrol route may be set in order that a patroller can recognize by viewing each equipment 11 to be inspected by viewing (this is also called "equipment to be inspected 11(K)"), among multiple equipments 11 within the plant.

The patrol terminal 2 includes a communication portion 20, an input portion 21, a storage portion 22, an image capturing portion 23, an image analysis portion 24, a perception detection portion 25, a position acquisition portion 26, an equipment detection portion 27, an electroencephalogram detection portion 28, and an alert portion 29. Note that, of the configuration of the patrol terminal 2, at least the image capturing portion 23, the image analysis portion 24, the perception detection portion 25, the position acquisition portion 26, the equipment detection portion 27, and the electroencephalogram detection portion 28 may be worn by the patroller, and in this embodiment, as an example, each of the configuration of the patrol terminal 2 may be worn by the patroller.

[2-1. Communication Portion 20]

The communication portion 20 wirelessly communicates with at least one of the operation control apparatus 15, the interface apparatus 16, or the resource management apparatus 17 in the management center 10.

[2-2. Input Portion 21]

The input portion 21 receives an input from the patroller. For example, a result of an inspection conducted during the patrol may be inputted to the input portion 21. The input portion 21 may supply the inputted content to the storage portion 22 and the like. The input portion 21 may receive an input through a key such as a physical key, or may receive an input through a sound/voice input.

[2-3. Storage Portion 22]

The storage portion 22 stores the inspection content to be conducted by the patroller.

For example, the storage portion 22 may store the equipment to be inspected 11(K), which should be inspected by viewing, by each position on the patrol route. The storage portion 22 may store equipment-unique information of the equipment to be inspected 11(K), which should be inspected by viewing at a position, associating said position with the position information indicating each position on the patrol route. The correspondence between the position on the patrol route and the equipment to be inspected 11(K) may be set by a veteran patroller, and as an example, may be set based on the equipment 11, which has been inspected by viewing during the patrol by the veteran patroller, and the position of the patroller, which has been inspected by viewing. In this embodiment, as an example, the position information indicates the latitude and the longitude acquired from a GPS satellite, however, as long as the position within the plant is uniquely specified, it may indicate another content.

Moreover, the storage portion 22 may further store the inspection position on the patrol route, on which a sensory inspection using a perception through at least one sense among the senses including the auditory sense, the olfactory sense and the tactile sense is to be conducted. The storage portion 22 may further store the category of the perception, which should be conducted at said position, and the equipment 11, for which the sensory inspection is to be conducted, associating them with the position information indicating each position on the patrol route.

Note that, the storage portion 22 may store other information, in addition to the inspection content. For example, the storage portion 22 may further store the reference electroencephalogram of the patroller at said position, by each position on the patrol route. In this embodiment, as an example, the storage portion 22 may store the reference electroencephalogram at said position, associating it with the position information indicating each position on the patrol route. The reference electroencephalogram may indicate the electroencephalogram, which has been measured at each position on the patrol route, when a patroller patrolled the patrol route under a state where there is no abnormality in each equipment 11 in the plant. The reference electroencephalogram may indicate a pattern of a basic rhythm (this is also called "background electroencephalogram"), such as α-wave or β-wave. The reference electroencephalogram may be an electroencephalogram which is different by each patroller who uses the patrol terminal 2.

Moreover, the storage portion 22 may further store the position information indicating the installation position and the identification data for identifying said equipment 11 from its appearance, for each equipment 11 in the plant. The identification data may be an image data of the appearance of the equipment 11, may be a data indicating the feature of the appearance (as an example, color, disposition of the buttons, etc.), or may be a data indicating the product name, the model number or the equipment-unique information provided outside the equipment 11. The data indicating the product name, the model number or the equipment-unique information may be exactly the product name, the model number, and/or the equipment-unique information, may be a code corresponding to them such as the barcode or the two-dimensional code (as an example, a QR Code (registered trademark)), and they may be provided to the equipment 11 by means of at least one of adhering, printing and imprinting.

Furthermore, the storage portion 22 may further store the result of the inspection (in this embodiment, as an example, the inspection by viewing and the sensory inspection), which has been conducted by the patroller. For example, the storage portion 22 may store the inspection result inputted from the input portion 21. As an example, the storage portion 22 may store the inspection result of the inspection by viewing, associating it with the equipment 11 to be inspected. Moreover, the storage portion 22 may store the inspection result of the sensory inspection, associating it with the position, at which that inspection has been conducted, or with the equipment 11 to be inspected.

[2-4. Image Capturing Portion 23]

The image capturing portion 23 captures the field of view of a patroller. The image capturing portion 23 may supply the image captured (this is also called "captured image") to the image analysis portion 24.

[2-5. Image Analysis Portion 24]

The image analysis portion 24 analyzes the captured image captured by the image capturing portion 23.

The image analysis portion 24 may detect each equipment 11 in the plant within the captured image. In addition to this, the image analysis portion 24 may detect a hand of the patroller within the captured image. For example, the image analysis portion 24 may conduct image processing, such as an edge extraction processing, to the captured image, to detect the equipment 11 or a hand of the patroller.

The image analysis portion 24 may generate data for specifying said equipment (this is also called "equipment specifying data"), for each detected equipment 11. The equipment specifying data may be data, which are of the same category with the identification data stored in the storage portion 22, may be an image data of the appearance of the equipment 11, may be the data indicating the feature of the appearance, or may be the data indicating the product name, the model number or the equipment-unique information provided outside the equipment 11.

The image analysis portion 24 may supply the equipment specifying data and the position information within the captured image to the equipment detection portion 27, for each equipment 11 detected within the captured image. The position information within the captured image may indicate the position information within the field of view of the patroller. If a hand of the patroller is detected within the captured image, the image analysis portion 24 may supply the position information of each equipment 11 and the hand within the captured image to the equipment detection portion 27 and the perception detection portion 25.

[2-6. Perception Detection Portion 25]

The perception detection portion 25 is an example of the third detection portion, and detects that a patroller has conducted a perception through at least one of the senses including the auditory sense, the olfactory sense and the tactile sense. In this embodiment, as an example, the perception detection portion 25 may detect that the patroller has conducted a perception through the tactile sense. The perception detection portion 25 may detect that the patroller has conducted a perception through the tactile sense, in response to the fact that a hand of the patroller has overlapped with the equipment 11. The perception detection portion 25 may detect that a hand and the equipment 11 have been overlapped, based on the position information of the hand and the equipment 11 within the captured image, which is supplied from the image analysis portion 24.

The perception detection portion 25 may, if it detects that the patroller has conducted a perception, supply a signal indicating thereof to the alert portion 29 and the equipment detection portion 27.

[2-7. Position Acquisition Portion 26]

The position acquisition portion 26 acquires the position of the patroller on the patrol route. The position acquisition portion 26 may supply the acquired information of the position to the equipment detection portion 27 and the alert portion 29.

[2-8. Equipment Detection Portion 27]

The equipment detection portion 27 detects the equipment 11, which was felt to be possibly abnormal by the patroller. The equipment detection portion 27 has an equipment detection-by-viewing portion 271 and an equipment detection-by-perceiving portion 272.

[2-8 (1). Equipment Detection-by-Viewing Portion 271]

The equipment detection-by-viewing portion 271 detects the viewed equipment 11(M), which has been viewed by a patroller.

The equipment detection-by-viewing portion 271 may detect an equipment 11, which has been detected in a central region of the captured image, as the viewed equipment 11(M), among the equipments 11 detected within the captured image by the image analysis portion 24. The equipment detection-by-viewing portion 271 may detect a viewed equipment 11(M), based on the position information of each equipment 11 within the captured image, which is supplied from the image analysis portion 24.

The equipment detection-by-viewing portion 271 may refer to the storage portion 22 to detect equipment-unique information of the viewed equipment 11(M), based on the equipment specifying data supplied from the image analysis portion 24 about said viewed equipment 11(M) and the position information of the patroller supplied from the position acquisition portion 26. The equipment detection-by-viewing portion 271 may supply equipment-unique information of the viewed equipment 11(M) to the alert portion 29.

[2-8 (2). Equipment Detection-by-Perceiving Portion 272]

The equipment detection-by-perceiving portion 272 is an example of a fourth detection portion, and detects the equipment 11, for which a sensory inspection using the perception has been conducted (this is also called "a perceived equipment 11(T)"), among the multiple equipments 11 in the plant.

The equipment detection-by-perceiving portion 272 may detect the equipment 11, which has been detected to be overlapping with a hand of the patroller, as the perceived equipment 11(T), among the equipments 11 detected within the captured image by the image analysis portion 24. The equipment detection-by-perceiving portion 272 may detect the perceived equipment 11(T), based on the position information of the hand and each equipment 11 within the captured image, which is supplied from the image analysis portion 24.

The equipment detection-by-perceiving portion 272 may refer to the storage portion 22 to detect equipment-unique information of the perceived equipment 11(T), based on the equipment specifying data supplied from the image analysis portion 24 about said perceived equipment 11(T) and the position information of the patroller supplied from the position acquisition portion 26. The equipment detection-by-perceiving portion 272 may supply equipment-unique information of the perceived equipment 11(T) to the alert portion 29.

[2-9. Electroencephalogram Detection Portion 28]

The electroencephalogram detection portion 28 is an example of the second detection portion, and detects the electroencephalogram of a patroller. The electroencephalogram detection portion 28 may have a plurality of electrodes disposed in contact with the head of the patroller, and may detect the electroencephalogram via the plurality of electrodes. In this embodiment, as an example, the electroencephalogram detection portion 28 may detect a pattern of a basic rhythm, such as $\alpha$-wave or $\beta$-wave of the electroencephalogram. The electroencephalogram detection portion 28 may supply the detected electroencephalogram to the alert portion 29.

[2-10. Alert Portion 29]

The alert portion 29 outputs an alert signal about the equipment 11 in the plant, in response to the action of the patroller. The alert portion 29 may have an inspection content detection portion 291, a judgment portion 292, a notification portion 293 and an output control portion 294.

[2-10 (1). Inspection Content Detection Portion 291]

The inspection content detection portion 291 detects the inspection content to be conducted by a patroller. For example, the inspection content detection portion 291 may detect the equipment to be inspected 11(K), which corresponds to the position of the patroller. Moreover, the inspection content detection portion 291 may detect the inspection position on the patrol route, for which the sensory inspection should be conducted.

The inspection content detection portion 291 may refer to the storage portion 22 to detect the inspection content. The inspection content detection portion 291 may supply the detection result to the judgment portion 292.

[2-10 (2). Judgment Portion 292]

The judgment portion 292 conducts a judgment whether or not to output an alert signal.

For example, the judgment portion 292 may judge whether or not an equipment to be inspected 11(K), which corresponds to the position of the patroller on the patrol route, has been detected as the viewed equipment 11(M). The judgment portion 292 may conduct a judgment, by comparing the equipment-unique information of the equipment to be inspected 11(K), which has been detected by the inspection content detection portion 291, and the equipment-unique information of the viewed equipment 11(M), which has been detected by the equipment detection-by-viewing portion 271. If the equipment to be inspected 11(K) has not been detected as the viewed equipment 11(M), it means that the patroller has viewed the viewed equipment 11(M) more preferentially than the equipment to be inspected 11(K), as such, it is highly possible that an abnormality occurred to the viewed equipment 11(M). Accordingly, the judgment result to the effect that the equipment to be inspected 11(K) has not been detected as the viewed equipment 11(M) may mean that an alert signal should be outputted.

The judgment portion 292 may judge that the equipment to be inspected 11(K), which corresponds to the position of the patroller on the patrol route, has not been detected as the viewed equipment 11(M), and further whether or not the difference between the electroencephalogram of the patroller and the reference electroencephalogram has exceeded the tolerance value. The judgment portion 292 may conduct a judgement, by comparing the reference electroencephalogram read out from the storage portion 22 and the electroencephalogram detected by the electroencephalogram detection portion 28. If the reference electroencephalogram by each patroller is stored in the storage portion 22, the reference electroencephalogram of the patroller who is using the patrol terminal 2 may be used for the judgment.

Here, that the difference between the electroencephalograms exceeds the tolerance value may be that the difference between the parameters indicating the pattern of the basic rhythms of the electroencephalograms exceeds the tolerance value. As an example, the amplitude of the α-wave becomes smaller, as the subject person gets nervous. The judgment portion 292 may judge whether or not the difference between the amplitude of the α-wave of the patroller and the amplitude of the α-wave of the reference electroencephalogram exceeds the tolerance value. When the equipment to be inspected 11(K) has not been detected as the viewed equipment 11(M) and the difference between the electroencephalograms is greater, it means that the patroller has viewed the viewed equipment 11(M) more preferentially than the equipment to be inspected 11(K) and that the patroller is under a nervous state, as such, it is highly possible that an abnormality occurred to the viewed equipment 11(M). Accordingly, the judgment result to the effect that the equipment to be inspected 11(K) has not been detected as the viewed equipment 11(M) and that the difference between the electroencephalograms has exceeded the tolerance value may mean that an alert signal should be outputted.

Moreover, the judgment portion 292 may judge whether or not the patroller has conducted a perception through either one of the senses at the position which is different from the inspection position at which a sensory inspection should be conducted. The judgment portion 292 may conduct a judgment, by comparing the inspection position for which a sensory inspection should be conducted, which has been detected by the inspection content detection portion, and the position of the patroller acquired by the position acquisition portion 26 when a perception is detected by the perception detection portion 25. If the perception is conducted at a position which is different from the inspection position, it means that the patroller has conducted a perception which is originally unnecessary, as such, it is highly possible that an abnormality occurred to the equipment 11 which was to be perceived. Accordingly, the judgment result to the effect that a perception has been conducted at a position which is different from the inspection position may mean that an alert signal should be outputted.

The judgment portion 292 may supply the judgment result to the notification portion 293.

[2-10 (3). Notification Portion 293]

When outputting an alert signal (in this embodiment, as an example, when a judgment has been conducted to the effect that an alert signal should be outputted), the notification portion 293 notifies thereof to the patroller. For example, the notification portion 293 may communicate to the patroller a message to the effect that an alert signal will be outputted unless a cancelling operation is conducted.

Note that, the notification portion 293 may notify the content of the inspection, which should be performed, to the patroller, in response to the position of the patroller on the patrol route. For example, the notification portion 293 may notify to the patroller of the equipment 11 to be inspected, and/or the category of the perception, which should be conducted in the sensory inspection, based on the detection result by the inspection content detection portion 291, to accordingly facilitate the inspection.

[2-10 (4). Output Control Portion 294]

The output control portion 294 controls output of an alert signal. The output control portion 294 may quit outputting the alert signal, in response to the cancellation of outputting the alert signal by the patroller who received the notification from the notification portion 293. The output control portion 294 may quit outputting the alert signal, in response to a cancelling instruction from the input portion 21.

The output control portion 294 may output the alert signal, in response to an order of outputting an alert signal. The output control portion 294 may output an alert signal, in response to the cancellation being not instructed for a reference time (as an example, for two seconds).

The output control portion 294 may output an alert signal to the management center 10 via the communication portion 20. In this embodiment, as an example, the output control portion 294 may output an alert signal to at least one of the operation control apparatus 15, the interface apparatus 16 or the resource management apparatus 17. The alert signal may include equipment-unique information of the equipment 11, which has been the object thereof. The alert signal may further include at least either of the position of the patroller or the captured image by the image capturing portion 23.

[2-11. Effects Obtained from the Patrol Terminal 2]

According to the above-described patrol terminal 2, an alert signal about the viewed equipment 11(M) is outputted in response to a fact that the equipment to be inspected 11(K), which corresponds to the position of the patroller on the patrol route, is not detected as the viewed equipment 11(M), therefore, an alert signal can be outputted to notify an abnormality about the equipment 11, which the patroller who sensed an abnormality viewed more preferentially than the equipment to be inspected 11(K).

Moreover, since the alert signal is outputted in response to the fact that the equipment to be inspected 11(K), which corresponds to the position of the patroller on the patrol route, has not been detected as the viewed equipment 11(M), and further that the difference between the electroencephalogram of the patroller and the reference electroencephalogram exceeded the tolerance value, the abnormality can be notified by outputting the alert signal about the equipment 11, which has been sensed by the patroller to be surely abnormal.

Furthermore, in response to the fact that the patroller has conducted a perception by a sense at a position different from the inspection position, at which the sensory inspection should be conducted, the alert signal about the perceived equipment 11(T), for which the sensory inspection using the perception has been conducted, among the multiple equipments 11 in the plant is outputted.

Accordingly, abnormality can be notified by outputting an alert signal about the perceived equipment 11(T), for which the detection by the sense has been conducted by the patroller who has sensed an abnormality.

Moreover, in response to the fact that a hand of the patroller overlapped with the equipment 11, it is detected that the patroller has conducted a perception by the tactile sense, and then the alert signal about the equipment 11 with which the hand of the patroller overlapped is outputted, therefore, abnormality can be notified by surely outputting the alert signal about the equipment 11, for which sensing by the tactile sense has been conducted by the patroller who has sensed an abnormality.

Furthermore, when outputting the alert signal, a notification is made to the patroller, and in response to the cancellation of outputting the alert signal, outputting the alert signal is quitted. Accordingly, outputting an alert signal about the equipment 11 which has been judged to have no abnormality by the patroller can be prevented.

Furthermore, the equipment which has been viewed by the patroller can be accurately and promptly detected, compared to a case where the position acquisition portion 26, the image capturing portion 23, the equipment detection portion 27 and the like of the patrol terminal 2 are not worn by the patroller, since they are worn by the patroller.

Moreover, since the alert portion 29 of the patrol terminal 2 is worn by the patroller and sends the alert signal to the management center 10 in the plant, the state of the equipment 11 which has been felt to be abnormal by the patroller can be confirmed in the management center 10.

[3. Appearance of the Patrol Terminal 2]

Figure 3:
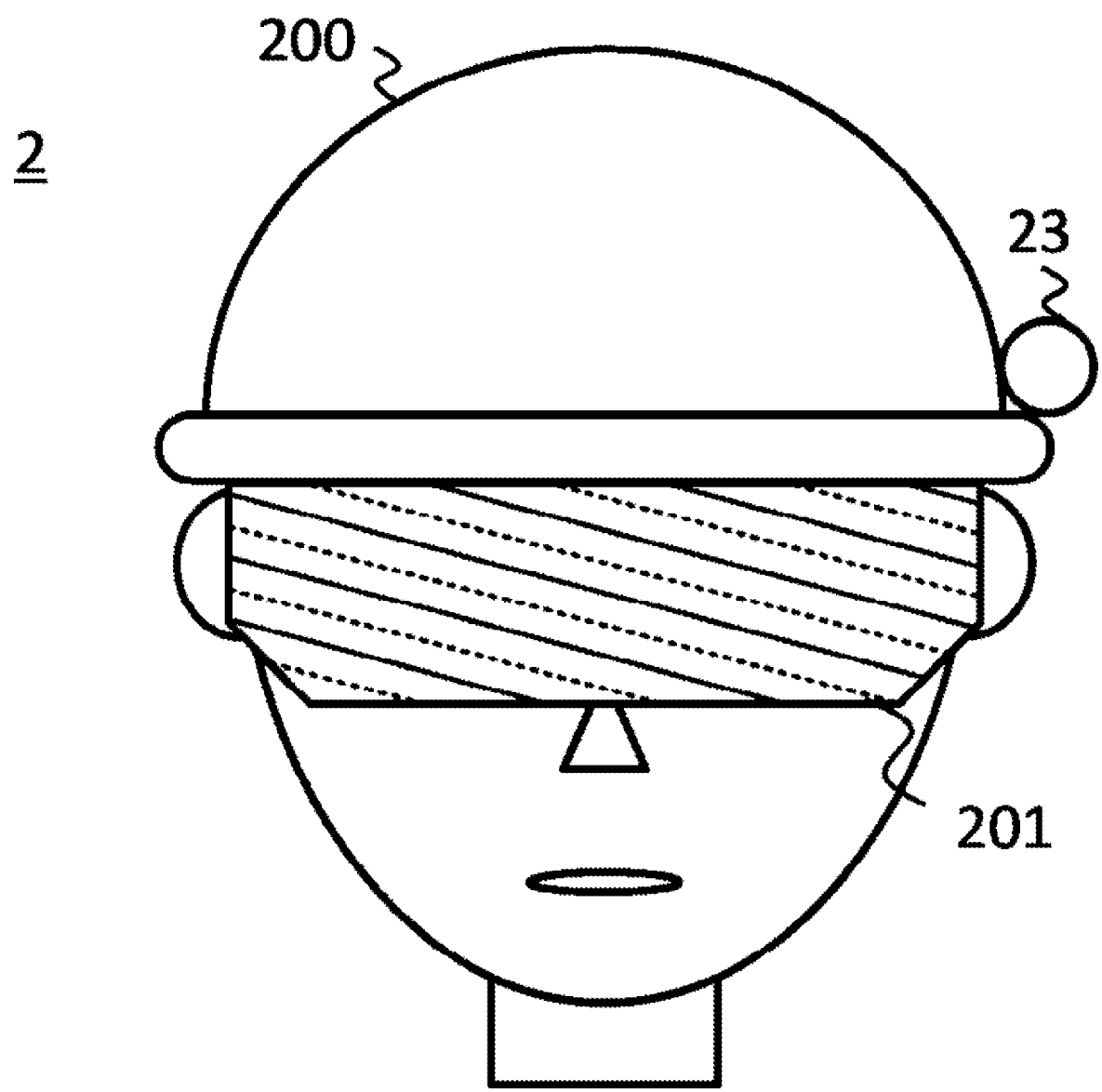
FIG. 3 shows an appearance of a patrol terminal 2.

FIG. 3 shows an appearance of a patrol terminal 2.

The patrol terminal 2 may be a wearable computer to be worn by a user, and in this embodiment, as an example, may be a so-called "head-mounted display", which is a head-mounted type. The patrol terminal 2 may have a helmet 200 to be worn on the user's head, a goggle 201 to cover the eyes of the user, and an image capturing portion 23.

The helmet 200 protects the head of the user. The goggle 201 is provided at a front part of the patrol terminal 2 to cover the eyes of the user. The goggle 201 is an example of the notification portion 293, and may be an optical see-through type display. The goggle 201 may display the notification content in the user's field of view in a superimposed manner.

The image capturing portion 23 is provided at a front part of the patrol terminal 2. In this embodiment, as an example, the image capturing portion 23 is provided in the helmet 200, however, it may be provided in the goggle 201.

[4. Action of the Patrol Terminal 2]

[4-1. Action Regarding the Viewed Equipment 11(M)]

Figure 4:
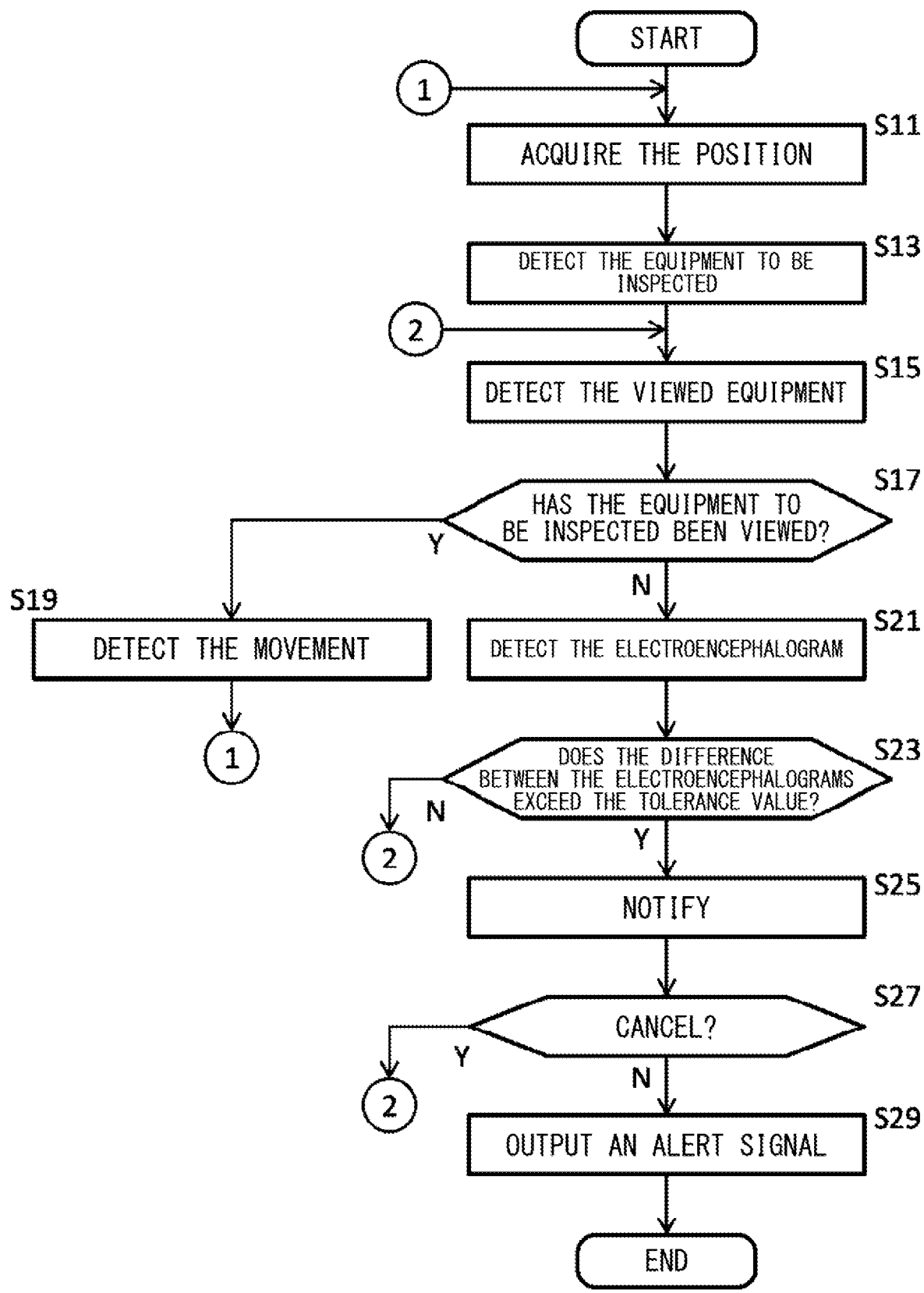
FIG. 4 shows an action regarding a viewed equipment 11(M).

FIG. 4 shows an action regarding an viewed equipment 11(M). The patrol terminal 2 outputs an alert signal about the viewed equipment 11(M), by perform the processings of steps S11 to S29. Note that, in this action and in an action regarding the later-described perceived equipment 11(T), the content other than the inspection result (as an example, the equipment to be inspected 11(K) or the like by each position on the patrol route), among the above-described stored content, may be preliminarily stored in the storage portion 22. Moreover, during action, the field of view of the patroller may be successively captured by the image capturing portion 23, so that the equipment specifying data of the equipment 11 detected by the image analysis portion 24 within the captured image is generated.

In step S11, the position acquisition portion 26 acquires the position of the patroller on the patrol route. The position acquisition portion 26 may acquire the position of the patrol terminal 2 as the position of the patroller. The position acquisition portion 26 may detect the current position coordinate of the patrol terminal 2, by receiving the radio signal transmitted from the GPS satellite.

However, the position acquisition portion 26 may acquire the position of the patrol terminal 2 by means of another approach. As an example, the position acquisition portion 26 may acquire the position of the patrol terminal 2, based on the Received Signal Strength Indicator (RSSI) from multiple base station disposed in the plant. Furthermore, the position acquisition portion 26 may calculate the position of the patrol terminal 2, by comparing the position and/or the size of each subject within the image preliminarily captured at each position on the patrol route with the position and/or the size of each subject within the image newly captured by the image capturing portion 23 during the patrol.

In step S13, the inspection content detection portion 291 of the alert portion 29 detects the equipment to be inspected 11(K), which corresponds to the position of the patroller. The inspection content detection portion 291 may refer the storage portion 22 to detect the equipment-unique information of the equipment to be inspected 11(K), which corresponds to the current position of the patroller, among the equipments to be inspected 11(K), which is stored by each position on the patrol route. If there are multiple equipments to be inspected 11(K), which correspond to the current position of the patroller, the inspection content detection portion 291 may acquire the equipment-unique information of each equipment to be inspected 11(K).

Note that, in step S13, the notification portion 293 of the alert portion 29 may notify to the patroller that each of the detected equipment to be inspected 11(K) is to be inspected by viewing. As an example, the notification portion 293 may display a mark indicating that it is to be inspected by viewing on the part overlapping with each of the equipments to be inspected 11(K), among the display region of the goggle 201. Moreover, in step S13, if there is no equipment to be inspected 11(K), which corresponds to the position of the patroller, the processing may shift to step S19.

In step S15, the equipment detection-by-viewing portion 271 of the equipment detection portion 27 detects the viewed equipment 11(M), which has been viewed by the patroller. The equipment detection-by-viewing portion 271 may detect the equipment 11, which has been detected at the central region of the captured image detected by the image analysis portion 24, as the viewed equipment 11(M). In this embodiment, as an example, the equipment detection-by-viewing portion 271 may detect the equipment 11, which has been continuously detected at the central region in the captured image for a first reference time (as an example, 3 seconds), as the viewed equipment 11(M). Furthermore, the equipment detection-by-viewing portion 271 may detect each equipment 11, which has been detected at the central region of the captured image during the second reference time after the equipment to be inspected 11(K) was detected by the processing in step S13, as the viewed equipment 11(M). The second reference time may be a length corresponding to the number of the equipment to be inspected 11(K), which was detected in the processing in step S13, or may be a fixed length, such as 10 seconds.

The equipment detection-by-viewing portion 271 may detect equipment-unique information of the viewed equipment 11(M), based on the equipment specifying data supplied from the image analysis portion 24 about the viewed equipment 11(M) and the position information of the patroller supplied from the position acquisition portion 26. In this embodiment, as an example, the equipment detection-by-viewing portion 271 may detect each equipment 11 within the reference range from the position indicated by the position information of the patroller (as an example, the range of 10 m radius), by collating the position information of the patroller with the position information of the installed position of each equipment 11 stored in the storage portion 22. Moreover, the equipment detection-by-viewing portion 271 may detect identification data matching with the equipment specifying data, by collating the identification data about each detected equipment 11 stored in the storage portion 22 with the equipment specifying data generated about the viewed equipment 11(M). The equipment detection-by-viewing portion 271 may take the equipment-unique information associated with the identification data matching with the equipment specifying data in the storage portion 22 as the equipment-unique information of the viewed equipment 11(M).

In step S17, the judgment portion 292 of the alert portion 29 judges whether or not the equipment to be inspected 11(K), which corresponds to the position of the patroller, has been detected as the viewed equipment 11(M). If there are multiple equipments to be inspected 11(K), which correspond to the position of the patroller, the judgment portion 292 may judge whether or not each of said multiple equipments to be inspected 11(K) has been detected as the viewed equipments 11(M), namely, whether or not all the equipments to be inspected 11(K) have been detected as the viewed equipments 11(M).

If each equipment to be inspected 11(K) is judged to have been detected as the viewed equipment 11(M) (step S17; Y), namely, if the patroller has inspected by viewing each equipment to be inspected 11(K) as usual, the processing shifts to step S19. In this case, the input portion 21 may store the inspection result inputted by the patroller in the storage portion 22.

If each equipment to be inspected 11(K) is judged to not have been detected as the viewed equipment 11(M) (step S17; N), namely, if the patroller, who sensed an abnormality, has viewed the viewed equipment 11(M) more preferentially than the equipment to be inspected 11(K), the processing shifts to step S21. Note that, the judgment portion 292 may judge that the equipment to be inspected 11(K) has not been detected as the viewed equipment 11(M), in response to a fact that said equipment to be inspected 11(K) is not detected as the viewed equipment 11(M) for the above-described second reference time (as an example, 10 seconds) after the equipment to be inspected 11(K) has been detected by the processing of step S13.

In step S19, the position acquisition portion 26 detects movement of the patroller. The position acquisition portion 26 may detect movement, in response to the fact that the re-acquired position is different from the position acquired in step S11. If a movement is detected, the processing may shift to step S11. In this case, the position acquisition portion 26 may not re-acquire the position of the patroller, to accordingly take the position acquired in step S19 as the position of the patroller.

In step S21, the electroencephalogram detection portion 28 detects the electroencephalogram of a patroller.

In step S23, the judgment portion 292 of the alert portion 29 judges whether or not difference between the electroencephalogram of the patroller and the reference electroencephalogram has exceeded the tolerance value. If the difference is judged to not have exceed the tolerance value (step S23; N), for example, if the degree of nervousness of the patroller is not high, the processing shifts to step S15. If the difference is judged to have exceed the tolerance value (step S23; Y), for example, if the degree of nervousness of the patroller is high, the processing shifts to step S25.

In step S25, the notification portion 293 of the alert portion 29 notifies to the patroller that an alert signal will be outputted. As an example, the notification portion 293 may display a message to the effect that an alert signal will be outputted unless cancelling operation is conducted, on the goggle 201. Moreover, the notification portion 293 may notify the patroller of which equipment 11 will have an alert signal being outputted thereto, in other words, it may notify the patroller of the viewed equipment 11(M), for which an alert signal is outputted. For example, the notification portion 293 may display a mark indicating that it is the object of an alert signal on the part overlapping with the viewed equipment 11(M), for which the alert signal is outputted, among the display region of the goggle 201. In this case, the patroller can judge whether or not to cancel outputting an alert signal, after confirming the equipment 11, which is the object of an alert signal.

Note that, the viewed equipment 11(M), for which the alert signal is outputted, may be an equipment 11, which is different from any of the equipments to be inspected 11(K), which have been detected in the processing of step S13, among each of the viewed equipment 11(M) detected in the processing of step S15. If there are multiple corresponding viewed equipment 11(M), the viewed equipment 11(M), for which the alert signal is outputted, may be the viewed equipment 11(M) which has been continuously detected at the central region in the captured image for the longest time, or may be the viewed equipment 11(M), which has been ultimately detected at the central region in the captured image.

In step S27, the output control portion 294 judges whether or not outputting of an alert signal has been cancelled by the patroller. If judged to have been cancelled (step S27; Y), the processing shifts to step S15. By this, outputting the alert signal is quitted, in response to the cancellation of outputting the alert signal. In step S27, if judged that outputting the alert signal has not been cancelled (step S27; N), the processing shifts to step S29.

In step S29, the output control portion 294 outputs an alert signal about the viewed equipment 11(M), for which the alert signal is outputted. The output control portion 294 may include the equipment-unique information of the viewed equipment 11(M), which has been detected by the equipment detection-by-viewing portion 271, in the alert signal.

[4-2. Action Regarding the Perceived Equipment 11(T)]

Figure 5:
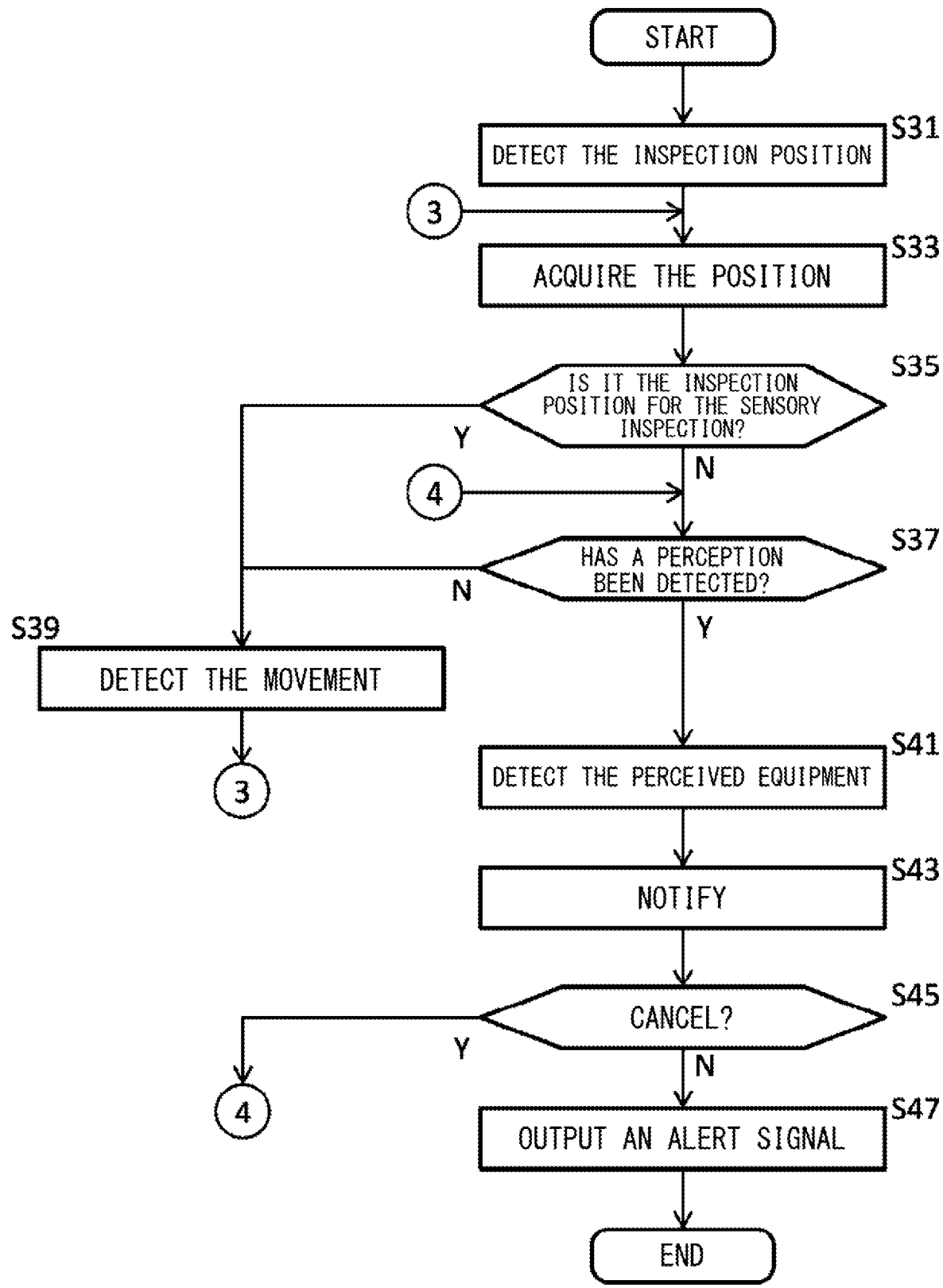
FIG. 5 shows an action regarding a perceived equipment 11(T).

FIG. 5 shows an action regarding a perceived equipment 11(T). The patrol terminal 2 outputs an alert signal about the perceived equipment 11(T), by conducting the processing of steps S31 to S47. Note that, this action may be performed in parallel with the actions about the above-described viewed equipment 11(M).

In step S31, the inspection content detection portion 291 detects the inspection position on the patrol route, for which a sensory inspection should be conducted. The inspection content detection portion 291 may refer to the storage portion 22 to detect the position information of each inspection position on the patrol route. The inspection content detection portion 291 may refer to the storage portion 22 to further detect the category of the perception to be conducted at each inspection position, and the equipment 11 for which the sensory inspection is to be conducted.

In step S33, the position acquisition portion 26 acquires the position of the patroller on the patrol route. The position acquisition portion 26 may acquire the position of the patroller, in a similar manner with the above-described step S11.

In step S35, the judgment portion 292 judges whether or not the position of the patroller is the inspection position of the sensory inspection. If it is judged that the position of the patroller is not the inspection position (step S35; N), the processing may shift to step S37. If it is judged that the position of the patroller is the inspection position (step S35; Y), the processing may shift to step S39.

Note that, if it is judged that the position of the patroller is the inspection position, the notification portion 293 of the alert portion 29 may notify to the patroller that the current position is the inspection position of the sensory inspection. As an example, the notification portion 293 may display the category of the perception to be conducted in the sensory inspection in the display region of the goggle 201. Furthermore, the input portion 21 may store the inspection result inputted by the patroller in the storage portion 22.

In step S39, the position acquisition portion 26 detects movement of a patroller. The position acquisition portion 26 may detect movement, in response to the fact that the re-acquired position is different from the position acquired in step S33. If a movement is detected, the processing may be shifted to step S33. In this case, the position acquisition portion 26 may not re-acquire the position of the patroller, to accordingly take the position acquired in step S39 as the position of the patroller.

In step S37, the judgment portion 292 judges whether or not a perception through at least one sense including the auditory sense, the olfactory sense and the tactile sense (in this embodiment, as an example, the tactile sense) has been conducted. In this embodiment, as an example, the judgment portion 292 may judge whether or not a perception has been detected by the perception detection portion 25. If it is judged that no perception has been conducted (step S37; N), the processing shifts to step S39. If it is judged that a perception has been conducted (step S37; Y), the processing shifts to step S41.

In step S41, the equipment detection-by-perceiving portion 272 of the equipment detection portion 27 detects the perceived equipment 11(T), for which the sensory inspection using the perception has been conducted. The equipment detection-by-perceiving portion 272 may detect an equipment 11, which has been detected overlapping with a hand of the patroller, as the perceived equipment 11(T), among the equipments 11 detected within the captured image by the image analysis portion 24. In this embodiment, as an example, the equipment detection-by-perceiving portion 272 may detect the equipment 11, which has been continuously detected overlapping with a hand within the captured image for a third reference time (as an example, 3 seconds), as the perceived equipment 11(T).

The equipment detection-by-perceiving portion 272 may detect equipment-unique information of the perceived equipment 11(T), based on the equipment specifying data supplied from the image analysis portion 24 about the perceived equipment 11(T) and the position information of the patroller supplied from the position acquisition portion 26. In this embodiment, as an example, the equipment detection-by-perceiving portion 272 may detect each equipment 11 within the reference range from the position indicated by the position information of the patroller (as an example, the range of 10 m radius), by collating the position information of the patroller with the position information of the installed position of each equipment 11 stored in the storage portion 22. Moreover, the equipment detection-by-perceiving portion 272 may detect identification data matching with the equipment specifying data, by collating the equipment specifying data supplied about the perceived equipment 11(T) with the identification data about each detected equipment 11 stored in the storage portion 22. Then, the equipment detection-by-perceiving portion 272 may take the equipment-unique information associated with the detected identification data in the storage portion 22 as the equipment-unique information of the perceived equipment 11(T).

In step S43, the notification portion 293 of the alert portion 29 notifies to the patroller that an alert signal will be outputted. As an example, the notification portion 293 may display a message to the effect that an alert signal will be outputted unless cancelling operation is conducted, on the goggle 201. Moreover, the notification portion 293 may notify the patroller of which equipment 11 will have an alert signal being outputted thereto, in other words, it may notify the patroller of the perceived equipment 11(T), for which an alert signal is outputted. For example, the notification portion 293 may display a mark indicating that it is the object of an alert signal, on the part overlapping with the perceived equipment 11(T), for which the alert signal is outputted, among the display region of the goggle 201. In this case, the patroller can judge whether or not to cancel outputting an alert signal, after confirming the equipment 11, which is the object of an alert signal. Note that, the perceived equipment 11(T), for which the alert signal is outputted, may be the perceived equipment 11(T), which has been detected in the processing in step S41.

In step S45, the output control portion 294 judges whether or not outputting of an alert signal has been cancelled by the patroller. If judged to have been cancelled (step S45; Y), the processing shifts to step S37. By this, outputting the alert signal is quitted, in response to the cancellation of outputting the alert signal.

In step S45, if judged that outputting the alert signal has not been cancelled (step S45; N), the processing shifts to step S47.

In step S47, the output control portion 294 outputs an alert signal about the perceived equipment 11(T). The output control portion 294 may include the equipment-unique information of the perceived equipment 11(T), which has been detected by the equipment detection-by-perceiving portion 272, in the alert signal.

[5. Modified Example of the Configuration for Detecting the Viewed Equipment 11(M)]

In the above-described embodiment, the equipment-unique information of the viewed equipment 11(M) has been explained to be detected using the equipment specifying data about the viewed equipment 11(M) supplied from the image analysis portion 24, however, it may be detected without using the equipment specifying data.

For example, the patrol terminal 2 may have a sensor group (not shown) for detecting the line of sight of the patroller or the gaze point (this is also called "gaze position") of the both eyes of the patroller. The line of sight of the patroller may be a straight line connecting the intermediate point between the both eyes and the gaze point of the patroller, or may be a straight line facing toward the front of the head through the intermediate point between the both eyes. The sensor group may include a 6-axis sensor, a magnetic sensor, a range finding sensor, an electro-oculogram sensor and the like. The 6-axis sensor may be a motion sensor (this is also called "inertial sensor") having a 3-axis acceleration sensor and a 3-axis gyro (angular velocity) sensor, and may detect motion of the patroller's head, and eventually a direction of the patrol terminal 2. The magnetic sensor may be, for example, a 3-axis geomagnetic sensor. The range finding sensor may measure a distance from the patrol terminal 2 to an object in the front (as an example, the equipment 11). The electro-oculogram sensor may detect a potential difference around an eye, to thereby detect the direction of the eyeball.

In this case, the equipment detection-by-viewing portion 271 may detect the equipment-unique information of the viewed equipment 11(M), based on the line of sight or the gaze position of the both eyes of the patroller. As an example, the equipment detection-by-viewing portion 271 may detect the line of sight and/or the gaze position of the patroller which originates from the position of the patroller, based on the measurement result by the sensor group and the position information acquired by the position acquisition portion 26. Moreover, the equipment detection-by-viewing portion 271 may refer the installed position of each equipment 11 stored in the storage portion 22, to accordingly detect the equipment 11, which is positioned on the line of sight or at the gaze position, as the viewed equipment 11(M).

Furthermore, the patrol terminal 2 may have an image capturing portion for capturing the eyeballs of the patroller. In this case, the equipment detection-by-viewing portion 271 may detect a line of sight, by analyzing the image of the eyeballs. Moreover, the equipment detection-by-viewing portion 271 may detect the distance from the patrol terminal 2 to the gaze point of the patroller and/or the gaze position, using a convergence angle calculated from the direction of the right and left eyeballs of the patroller.

[6. Modified Example of the Configuration for Detecting the Perceived Equipment 11(T)]

In the above-embodiment, it has been explained that the perception detection portion 25 detects that a perception has been conducted by the tactile sense by the patroller, however, in addition to this, or instead of this, it may detect that a perception through at least one of the auditory sense and the olfactory sense has been conducted.

The perception detection portion 25 may, if it detects a perception by the auditory sense, detect an action to listen carefully by the patroller. For example, the perception detection portion 25 may detect the motion of the head of the patroller by means of a 6-axis sensor, and may take that a perception through the auditory sense has been conducted in response to the fact that the head stopped for more than the reference time. Moreover, the perception detection portion 25 may take that a perception through the auditory sense has been conducted, in response to the fact that the patroller's eyes have been closed for more than the reference time (as an example, 2 seconds) in the image from the image capturing portion capturing the eyeballs of the patroller. Furthermore, the perception detection portion 25 may take that a perception through the auditory sense has been conducted, in response to the fact that a palm of the patroller has been put on the back of an ear, in the image from the image capturing portion capturing the ear of the patroller. In addition, the perception detection portion 25 may take that a perception through the auditory sense has been conducted, in response to the fact that a sound pressure exceeding the reference sound pressure (as an example, 60 dB) has been measured by the sensor measuring the ambient sound pressure of the patrol terminal 2. If the perception detection portion 25 detects a perception through the auditory sense, the equipment detection-by-perceiving portion 272 may detect one or more equipments 11 within the reference range from the patroller (as an example, the range of 10 m radius) as the perceived equipment 11(T).

Moreover, when detecting a perception through the olfactory sense, the perception detection portion 25 may take that a perception through the olfactory sense has been conducted, in response to the fact that air has been inhaled from the nose of the patroller at a frequency exceeding the reference frequency (as an example, 2 times in 1 second) in the image from the image capturing portion capturing the nasal cavity of the patroller. If the perception detection portion 25 detects a perception through the olfactory sense, the equipment detection-by-perceiving portion 272 may detect one or more equipments 11 (as an example, an equipment 11 which is the nearest to the patroller) within the reference range from the patroller (as an example, the range of 5 m radius), and/or one or more equipment 11 which is/are upwind of the patroller, as the perceived equipment 11(T). When detecting an equipment 11 which is upwind of the patroller, the equipment detection-by-perceiving portion 272 may detect the equipment 11 positioned upwind than the patroller, based on the measurement result by the wind direction sensor for measuring the wind direction around the patroller and the position information acquired by the position acquisition portion 26.

Note that, when the perception detection portion 25 detects a perception through two or more senses among the tactile sense, the auditory sense and the olfactory sense, the equipment detection-by-perceiving portion 272 may detect the equipment 11, for which the sensory inspection through all the senses has been conducted, as the perceived equipment 11(T). For example, when the perception detection portion 25 detects a perception through the first sense and a perception through the second sense, the equipment detection-by-perceiving portion 272 may detect the equipment 11, for which the sensory inspection through the first sense has been conducted and the sensory inspection through the second sense has been conducted, as the perceived equipment 11(T).

Instead of this, the equipment detection-by-perceiving portion 272 may detect the equipment 11, for which the sensory inspection through said sense has been conducted, by each sense to be detected by the perception detection portion 25. For example, when the perception detection portion 25 detects a perception through the first sense and a perception through the second sense, the equipment detection-by-perceiving portion 272 may detect the equipment 11, for which the sensory inspection through the first sense has been conducted, and the equipment 11, for which the sensory inspection through the second sense has been conducted, as the perceived equipment 11(T), respectively.

[7. Examples of Other Modifications]

In the above-described embodiment, the patrol terminal 2 is explained to include the communication portion 20, the input portion 21, the image capturing portion 23, the image analysis portion 24, the perception detection portion 25, the position acquisition portion 26, the equipment detection-by-perceiving portion 272 of the equipment detection portion 27, and the electroencephalogram detection portion 28, however, it may be configured not to include either of them. If the patrol terminal 2 does not include the communication portion 20, the alert portion 29 of the patrol terminal 2 may output an alert signal to the periphery of the patrol terminal 2.

Furthermore, each portion of the patrol terminal 2 was explained to be worn by the patroller, however, the alert portion 29 may not be worn by the patroller, in turn, it may be disposed in the management center 10 of the plant. For example, the patrol terminal 2 may include the terminal main body to be worn by the patroller and the alert portion 29 disposed in the management center 10, the terminal main body including the image capturing portion 23 and/or the image analysis portion 24, the perception detection portion 25, the position acquisition portion 26, the equipment detection portion 27, the electroencephalogram detection portion 28, the storage portion 22, the input portion 21 and the like. In this case, the configuration to be worn by the patroller can be reduced, thereby reducing the weight of the terminal main body.

In addition, the alert portion 29 is explained to include the notification portion 293, however, it may be configured not to include the notification portion 293. In this case, the alert portion 29 may output an alert signal about the viewed equipment 11(M), in response to a fact that the equipment to be inspected 11(K), which corresponds to the position of the patroller on the patrol route, is not detected, as the viewed equipment 11(M).

Also, various embodiments of the present invention may be described with reference to flowcharts and block diagrams. Here, blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. A dedicated circuitry may include digital and/or analog hardware circuits, and may include integrated circuits (IC) and/or discrete circuits. A programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

A computer-readable medium may include any tangible device that can store instructions to be executed by a suitable device, and as a result, the computer-readable medium having instructions stored thereon comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of the computer-readable medium may include a Floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, and the like.

The computer-readable instruction may include an assembler instruction, an instruction-set-architecture (ISA) instruction, a machine instruction, a machine dependent instruction, a microcode, a firmware instruction, state-setting data, or either a source code or an object code written in any combination of one or more programming languages, including an object-oriented programming language such as Smalltalk (registered trademark), JAVA (registered trademark), C++, or the like, and a conventional procedural programming language such as a "C" programming language or a similar programming language.

The computer-readable instructions may be provided to a processor of a general purpose computer, special purpose computer, or other programmable data processing apparatus, or to a programmable circuitry, locally or via a local area network (LAN), wide area network (WAN) such as the Internet, or the like, to execute the computer-readable instructions to create means for performing operations specified in the flowcharts or block diagrams. Examples of the processor include a computer processor, a processing unit, a microprocessor, a digital signal processor, a controller, a microcontroller, and the like.

Figure 6:
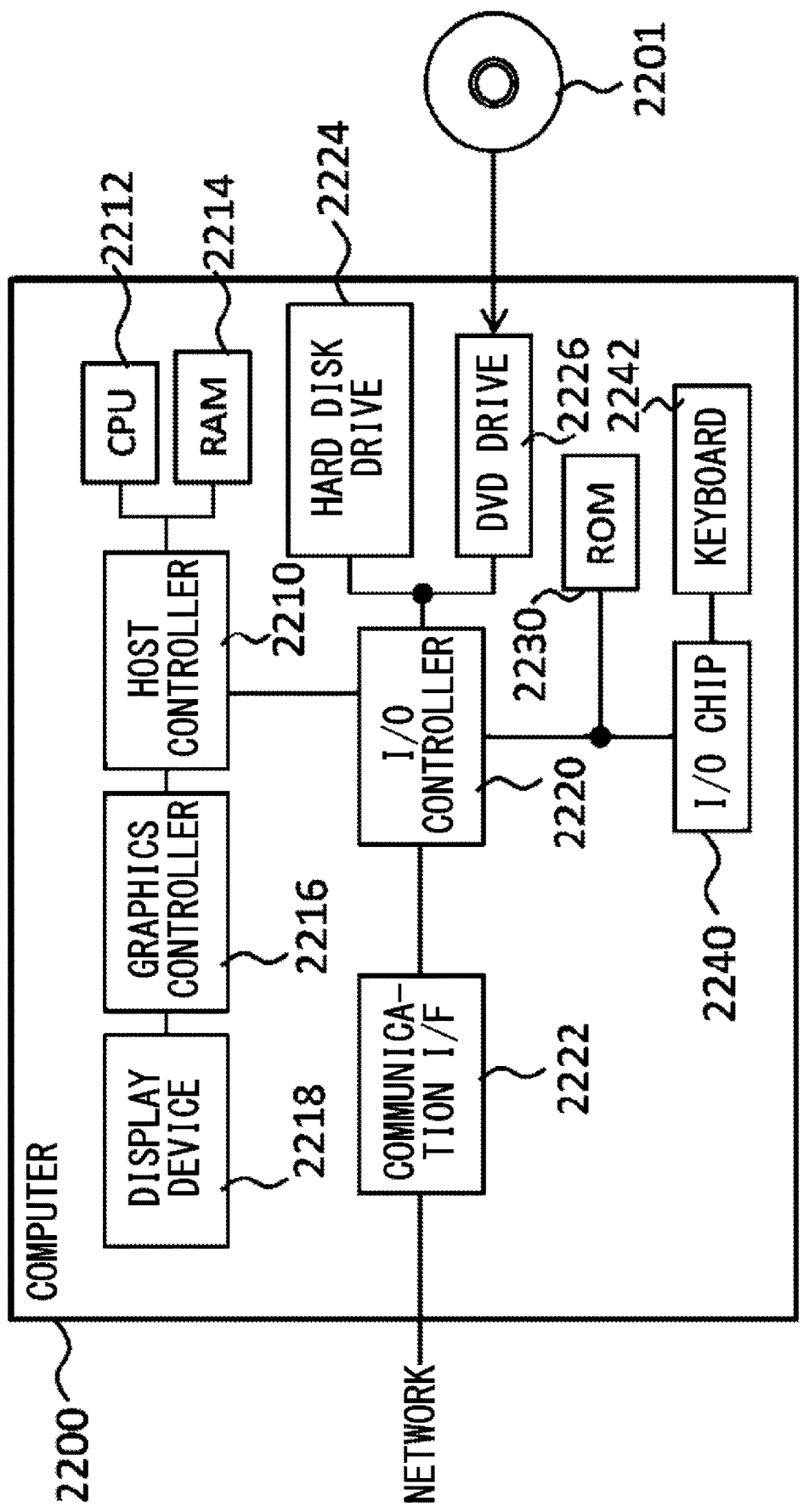
FIG. 6 shows an example of a computer 2200 which multiple aspects of the present invention may be embodied entirely or partially.
Figure 7:
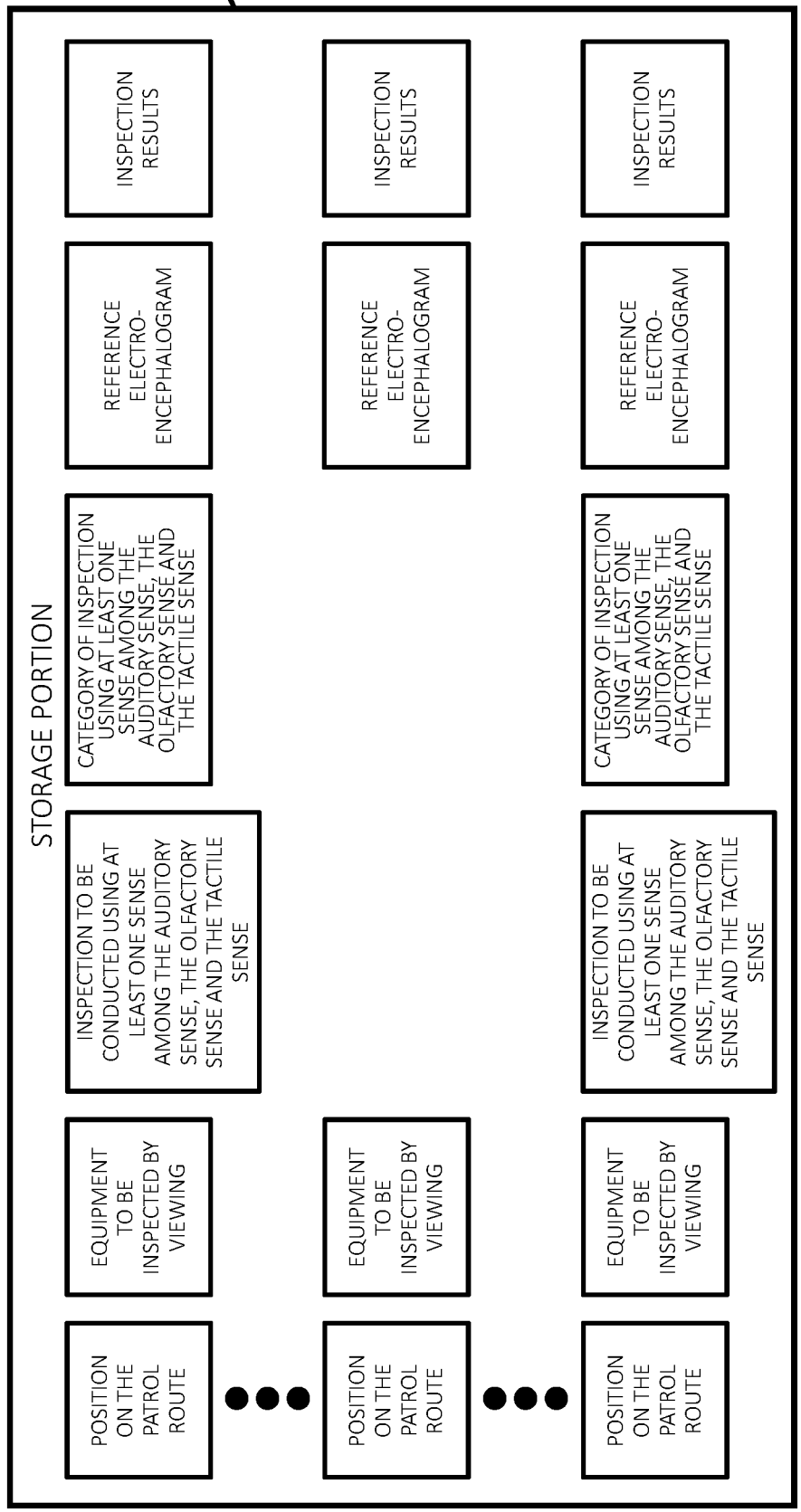
FIG. 7 shows a diagrammatic illustration of examples of information that may be stored by the storage portion of the patrol terminal of FIG. 2.

FIG. 6 shows an example of a computer 2200 which multiple aspects of the present invention may be embodied entirely or partially. A program that is installed in the computer 2200 can cause the computer 2200 to function as operations associated with apparatuses according to the embodiments of the present invention or one or more sections of the apparatuses thereof, or can cause the computer 2200 to perform the operations or the one or more sections thereof, and/or can cause the computer 2200 to perform processes of the embodiments according to the present invention or steps of the processes thereof. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphics controller 2216, and a display device 2218, which are interconnected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates according to programs stored in the ROM 2230 and the RAM 2214, to thereby control each unit. The graphics controller 2216 acquires image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from a DVD-ROM 2201, and provides the hard disk drive 2224 with the programs or the data via the RAM 2214. The IC card drive reads the program and data from an IC card, and/or writes the program and data to the IC card.

The ROM 2230 stores, in itself, a boot program or the like that is executed by the computer 2200 during activation, and/or a program that depends on hardware of the computer 2200. The input/output chip 2240 may also connect various input/output units to the input/output controller 2220 via a parallel port, a serial port, a keyboard port, a mouse port, and the like.

A program is provided by computer-readable media such as the DVD-ROM 2201 or the IC card. The program is read from the computer-readable medium, installed in the hard disk drive 2224, the RAM 2214, or the ROM 2230, which is also an example of the computer-readable medium, and executed by the CPU 2212. The information processing written in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (the DVD-ROM 2201), the IC card, etc., and perform various types of processing on the data on the RAM 2214. The CPU 2212 then writes back the processed data to the external recording medium.

Various types of information, such as various types of programs, data, tables, and databases, may be stored in the recording medium to undergo information processing. The CPU 2212 may execute various types of processing on the data read from the RAM 2214 to write back a result to the RAM 2214, the processing being described throughout the present disclosure, specified by instruction sequences of the programs, and including various types of operations, information processing, condition determinations, conditional branching, unconditional branching, information retrievals/replacements, or the like. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby acquiring the attribute value of the second attribute associated with the first attribute satisfying the predetermined condition.

The above-described program or software modules may be stored in the computer-readable media on the computer 2200 or near the computer 2200. In addition, a recording medium such as a hard disk or a RAM provided in a server system connected to a dedicated communication network or the Internet can be used as the computer-readable media, thereby providing the program to the computer 2200 via the network.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1 Maintenance management system
2 Patrol terminal
10 Management center
11 Equipment
12 Maintenance terminal
15 Operation control apparatus
16 Interface apparatus
17 Resource management apparatus
20 Communication Portion
21 Input portion
22 Storage portion
23 Image capturing portion
24 Image analysis portion
25 Perception detection portion
26 Position acquisition portion
27 Equipment detection portion
28 Electroencephalogram detection portion
29 Alert portion
200 Helmet
201 Goggle
271 Equipment detection-by-viewing portion
272 Equipment detection-by-perceiving portion
291 Inspection content detection portion
292 Judgment portion
293 Notification portion
294 Output control portion

What is claimed is:

1. An apparatus configured to be worn by a user acting as a patroller to facilitate inspection of equipment in a plant, comprising:

a storage portion configured to store information regarding each equipment to be inspected in the plant which should be inspected by an inspection that includes inspection by viewing by the patroller, wherein the information regarding each equipment to be inspected includes a position of each equipment to be inspected along a patrol route;

a position acquisition portion configured to acquire a position of the patroller on the patrol route;

a first detection portion configured to detect a viewed equipment which has been viewed by the patroller; and an alert portion configured to output an alert signal about the viewed equipment, unless the alert signal is canceled by the patroller, in response to a fact that the equipment to be inspected, which corresponds to the position of the patroller on the patrol route, is not detected as the viewed equipment.

2. The apparatus according to claim 1, wherein the alert portion includes:

a notification portion configured to notify the patroller that the alert signal will be outputted when the equipment to be inspected is not detected as the viewed equipment, wherein the patroller is notified with a notification that the alert signal will be outputted; and an output control portion configured to cancel outputting of the alert signal, in response to cancellation of outputting the alert signal by the patroller who received the notification, wherein the alert signal will be outputted in the absence of cancellation by the patroller within a predetermined time period.

3. The apparatus according to claim 1, further comprising a second detection portion for detecting an electroencephalogram of the patroller, wherein:

the storage portion further stores, for each position on the patrol route corresponding to the position of each of the equipment to be inspected along the patrol route, a reference electroencephalogram of the patroller; and the alert portion outputs the alert signal, unless the alert signal is canceled by the patroller, in response to the fact that the equipment to be inspected, which corresponds to a position of the patroller on the patrol route, is not detected as the viewed equipment, and in response to a fact that a difference between the electroencephalogram of the patroller and the reference electroencephalogram exceeded a tolerance value.

4. The apparatus according to claim 2, further comprising a second detection portion for detecting an electroencephalogram of the patroller, wherein:

the storage portion further stores, for each position on the patrol route corresponding to the position of each of the equipment to be inspected along the patrol route, a reference electroencephalogram of the patroller; and the alert portion outputs the alert signal, unless the alert signal is canceled by the patroller, in response to the fact that the equipment to be inspected, which corresponds to a position of the patroller on the patrol route, is not detected as the viewed equipment, and in response to a fact that a difference between the electroencephalogram of the patroller and the reference electroencephalogram exceeded a tolerance value.

5. The apparatus according to claim 1, wherein the patroller has senses in addition to sight, further comprising:
a third detection portion configured to detect that a patroller has conducted an additional inspection of one of the equipment in the plant through at least one of the senses selected from the group consisting of an auditory sense, an olfactory sense and a tactile sense, which is in addition to the inspection by viewing; and
a fourth detection portion configured to detect an equipment, for which the additional inspection has been conducted, among the equipment in the plant,
wherein the storage portion further stores information indicative of an inspection position on the patrol route, at which the additional inspection should be conducted by the patroller, and
the alert portion further outputs an alert signal about the equipment detected by the fourth detection portion in response to a fact that the patroller has conducted the additional inspection at a position that is different from the inspection position.

6. The apparatus according to claim 2, wherein the patroller has senses in addition to sight, further comprising:
a third detection portion configured to detect that a patroller has conducted an additional inspection of one of the equipment in the plant through at least one of the senses selected from the group consisting of an auditory sense, an olfactory sense and a tactile sense, which is in addition to the inspection by viewing; and
a fourth detection portion configured to detect an equipment, for which the additional inspection has been conducted, among the equipment in the plant,
wherein the storage portion further stores information indicative of an inspection position on the patrol route, at which the additional inspection should be conducted by the patroller, and
the alert portion further outputs an alert signal about the equipment detected by the fourth detection portion in response to a fact that the patroller has conducted the additional inspection at a position that is different from the inspection position.

7. The apparatus according to claim 5 comprising:
an image capturing portion configured to capture an image of a field of view of the patroller, and
an image analysis portion configured to detect a hand of the patroller and any of the equipment in the plant, within an image captured by the image capturing portion,
wherein the third detection portion detects that the patroller has conducted the additional inspection at least by the tactile sense, in response to a fact that the hand of the patroller has overlapped with one of the equipment in the plant within the image captured by the image capturing portion, and
the fourth detection portion detects the one of the equipment in the plant with which the hand of the patroller has overlapped within the image captured by the image capturing portion.

8. The apparatus according to claim 1, wherein the alert portion sends the alert signal to a management center of the plant.

9. A method, comprising:
providing an apparatus configured to be worn by a user acting as a patroller; and
operating the apparatus by a method comprising:
storing information regarding each equipment to be inspected in a plant, which should be inspected by an inspection that includes inspection by viewing by the patroller, wherein the information regarding each equipment to be inspected includes a position of each equipment to be inspected along a patrol route,
acquiring a position of the patroller on a patrol route,
a first detecting, for detecting a viewed equipment, which has been viewed by the patroller; and
outputting, in the absence of cancellation by the patroller, an alert signal about the viewed equipment, in response to a fact that the equipment to be inspected, which corresponds to the position of the patroller on the patrol route, is not detected as the viewed equipment.

10. A non-transitory recording medium on which a program is recorded, wherein the program causes a computer, incorporated in an apparatus configured to be worn by a user acting as a patroller, to function as:
a storage portion configured to store information regarding each equipment to be inspected in a plant, which should be inspected by an inspection that includes inspection by viewing by the patroller, wherein the information regarding each equipment to be inspected includes a position of each equipment to be inspected along a patrol route,
a position acquisition portion configured to acquire a position of the patroller on the patrol route;
a first detection portion configured to detect a viewed equipment, which has been viewed by the patroller; and
an alert portion configured to output an alert signal about the viewed equipment, unless the alert signal is canceled by the patroller, in response to a fact that the equipment to be inspected, which corresponds to the position of the patroller on the patrol route, is not detected as the viewed equipment.

* * * * *